US011656072B2

United States Patent
Rueb

(10) Patent No.: US 11,656,072 B2
(45) Date of Patent: May 23, 2023

(54) CLASSIFICATION OF LASER SPECKLE PROFILES FOR VALIDATION OF PART PLACEMENT IN AN ASSEMBLY TASK

(71) Applicant: VIRTEK VISION INTERNATIONAL, ULC, Waterloo (CA)

(72) Inventor: Kurt D Rueb, Kitchener (CA)

(73) Assignee: VIRTEK VISION INTERNATIONAL INC., Waterloo (CA)

( * ) Notice: Subject to any disclaimer, the term of this patent is extended or adjusted under 35 U.S.C. 154(b) by 21 days.

(21) Appl. No.: 17/364,967

(22) Filed: Jul. 1, 2021

(65) Prior Publication Data

US 2022/0003536 A1 Jan. 6, 2022

Related U.S. Application Data

(60) Provisional application No. 63/047,394, filed on Jul. 2, 2020.

(51) Int. Cl.
*G01B 9/02* (2022.01)
(52) U.S. Cl.
CPC ..... *G01B 9/02094* (2013.01); *G01B 9/02083* (2013.01)

(58) Field of Classification Search
CPC ............ G01B 9/02094; G01B 9/02083; G01B 11/272; G01B 11/002; G01B 11/2441; G01B 11/00; G01B 11/2522; B29C 70/38
See application file for complete search history.

(56) References Cited

U.S. PATENT DOCUMENTS

| | | | |
|---|---|---|---|
| 9,200,899 B2 * | 12/2015 | Rueb | ............. H04N 9/3129 |
| 9,245,062 B2 | 1/2016 | Rueb | |
| 9,442,075 B2 | 9/2016 | Rueb | |
| 9,881,383 B2 | 1/2018 | Rueb | |
| 2010/0195113 A1 * | 8/2010 | Lee | ............. G01B 9/02078 356/450 |
| 2014/0160490 A1 * | 6/2014 | Nishikawa | ......... G01B 9/02002 356/511 |

* cited by examiner

*Primary Examiner* — Hwa Andrew Lee
(74) *Attorney, Agent, or Firm* — Gregory D. DeGrazia; Miller, Canfield Paddock and Stone PLC

(57) ABSTRACT

A method for validating the placement of pieces in an assembly task by scanning a coherent light source, such as a laser, over a surface and characterizing the detected interference speckle pattern to discriminate the position of the placed piece from the surface on which the piece is placed. This discrimination is possible even if the characteristic features of the piece and background are smaller than the resolution of the scanning system. In addition, characteristics of the piece, such as the orientation of fibers in the material, may be sensed by classification of the associated speckle response.

18 Claims, 6 Drawing Sheets

CLASSIFICATION OF LASER SPECKLE PROFILES FOR VALIDATION OF PART PLACEMENT IN AN ASSEMBLY TASK

PRIOR APPLICATIONS

The present application claims priority to U.S. Patent Application No. 63/047,394 filed on Jul. 2, 2020, the contents of which are included herein in entirety.

TECHNICAL FIELD

The present invention relates generally to a method of inspecting surfaces of an assembly to verify accuracy of a manufacturing process. More specifically, the present invention relates to an improved method of identing proper placement and orientation of a component or piece upon a worksurface.

BACKGROUND

For certain types of assembly, validating the placement of components can be difficult to achieve with conventional imaging systems. For example, when creating composite parts, many layers are placed sequentially on a tool surface. A typical piece, ply, component, or fiber impregnated tape may consist of a carbon fiber material impregnated in a carrier resin that is placed on previous more-or-less identical layers until a predetermined thickness of composite is achieved. Each piece is typically placed either by a robotic fiber tape laying machine or positioned manually guided by a projected laser pattern that serves as an optical template to guide the assembly. However, for either type of placement, the location of each piece and the orientation of the fibers within the material must be confirmed to guarantee the strength and structural integrity of the component produced. Currently, this is achieved by manual inspection, comparing the placement of each piece to the projected laser template. Unfortunately, this inspection method is quite slow and prone to human error because it relies on human interpretation.

The necessity to inspect assembly process is not just limited to layering composite materials but is required of many assemblies. Often, two components that are difficult or impossible to visually distinguish are mated during an assembly process that when mated present difficult or impossible challenges to verify proper placement and orientation. In this case, manual inspection is not feasible when consistent results are necessary.

To reduce the requirement for manual inspection, it would be desirable to automate the inspection process, for example, by measuring the piece location and fiber orientation using an inspection camera. However, the tools used to create components may be very large and the features of the piece very small (e.g. a 20 foot tool with the material composed of carbon fibers only thousandths of an inch in diameter). As a result, any ordinary inspection camera or device will typically not have the ability to directly resolve the features of individual pieces to validate their placement.

In addition, the carbon fiber material responds in a very directional manner, either reflecting any ambient light in a specular manner (direct reflection) or absorbing any remaining light in the dark fibers. Similar difficulties exist with other materials that present similar surface characteristics when assembled. Each of these material characteristic greatly increase the difficulty in successfully automating the inspection process. Known camera-based inspection systems have proven ineffective for achieving accurate and consistent inspection results under these circumstances. Therefore, it would be desirable to automate the inspection process in a manner that would provide consistent and accurate inspection results of work surface after a piece or component has been mated to the work surface to verify proper placement and orientation.

SUMMARY

To overcome the problems associated with inspecting two elements, such as a component or piece and a work surface, the invention of the present application presents a method for evaluating interference speckle generated by a coherent light source. In one embodiment, a method for verifying the placement of pieces within an assembly task includes placing a piece of impregnated ply onto a work surface. In another embodiment, the method is used to verify placement of a component on a work surface when the component is difficult to distinguish from the work surface. A coherent light source is scanned across a surface of the placed piece and along the work surface disposed as a background to the placed piece. An optical sensing system records the optical characteristics of an interference speckle produced by scattered coherent light from the coherent light source, in one non-limiting embodiment a laser. The speckle response for discriminating between the surface of the piece and the background to validate the placement of the piece or component is classified for determining if the piece or component has been placed and oriented properly.

To overcome the difficulties of known camera-based inspection methods, the method of this invention scans a coherent light source over a section of the work surface and monitors the characteristic of the light reflected from the surface. Coherent light, such as, for example, a laser beam provides a very intense illumination of the piece or component and the work surface source, overcoming any poor reflectivity of the surface. Thus, the resulting interference characteristic of the returned light or speckle is capable of distinguishing the microstructure of the surface of the inspected piece or component from the work surface. The process and system of the present invention may be used to identify alignment of any materials, whether visibly distinguishable or not. This includes placement of trusses and aligning nail plates, fabrics, metallic components, mating metallic structures and any two components that may be assembled or mated in a manner that requires verification that the assembly was performed properly. In another complementary embodiment, the calibrated laser currently used to project directional templates onto a work surface for accurate placement can also provide a reference for manual inspection to perform an inspection scan providing necessary accuracy to validate the placement.

DETAILED DESCRIPTION

The invention of the present application makes use of coherent light to distinguish two different components, such as, for example, a work surface and a ply, piece, or assembly component. When coherent light reflects off a surface, roughness or texture of the surface create varying reflective that creates and interference pattern. The interference pattern is generated due to the roughness and slop of the surface. For example, two different materials, such as plastic and fabric generate different interference patterns when reflecting coherent light The interference pattern results from speckle, which is an optical characteristic that produces image variation. When a laser is used to generate the coherent light, this phenomenon is sometimes referred to as laser speckle. Speckle patterns typically occur in diffuse reflections of monochromatic light when produced by a laser. Speckle patterns vary with the types of surfaces or substrates the coherent light is reflected from, such as paper, white paint, or other rough surfaces. Reflectivity varies with surface roughness.

Figure 1:
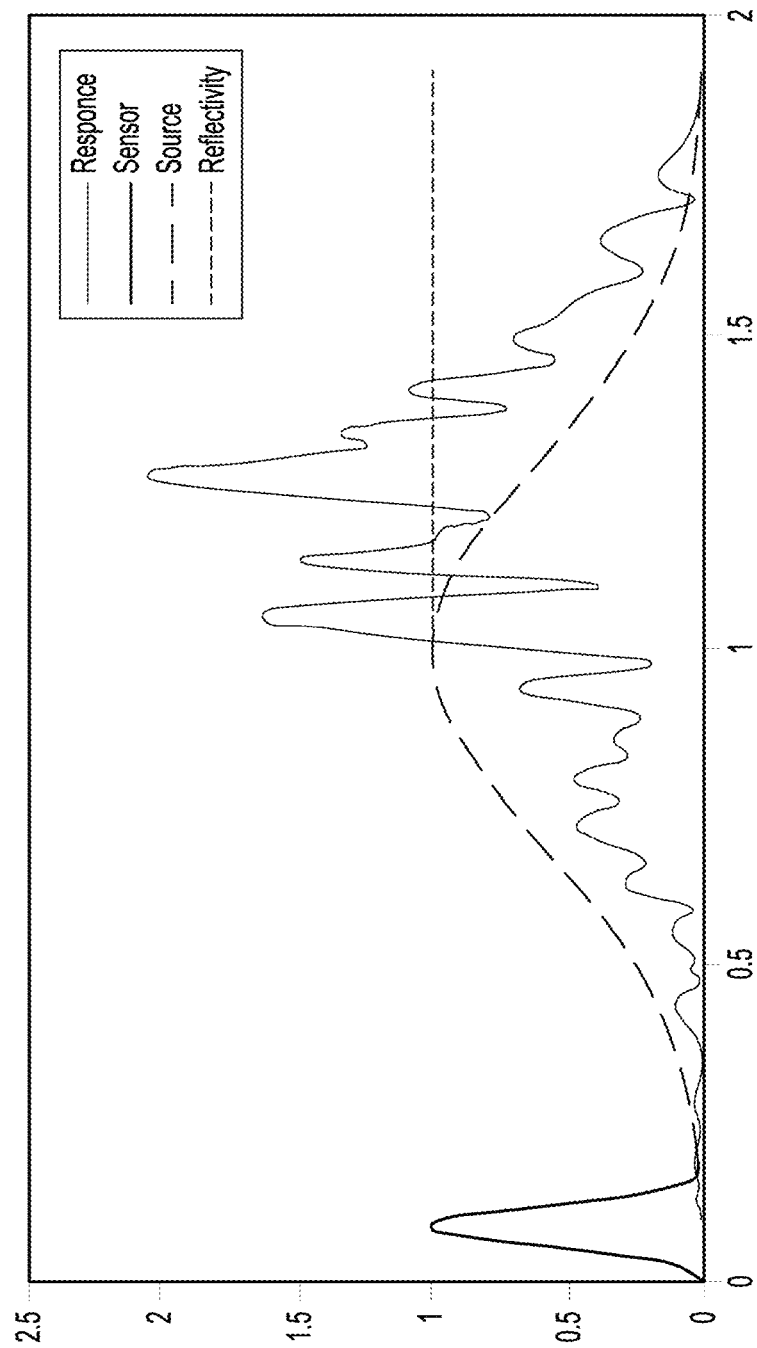
FIG. 1 shows a reconstruction of an expected image from laser source illumination characteristics.

Referring to FIG. 1, show an exemplary reconstruction of an expected image relative to a surface onto which the coherent light is projected. The X-axis indicates millimeters while the Y-axis indicates intensity. The response is dependent upon the nature of the surface being illuminated, coherent light source or laser characteristics and response of camera optics. While the reflectivity, coherent light source and sensor output is the consistent, the response is inconsistent and relative to the physical characteristics of the surface being illuminated.

Figure 3:
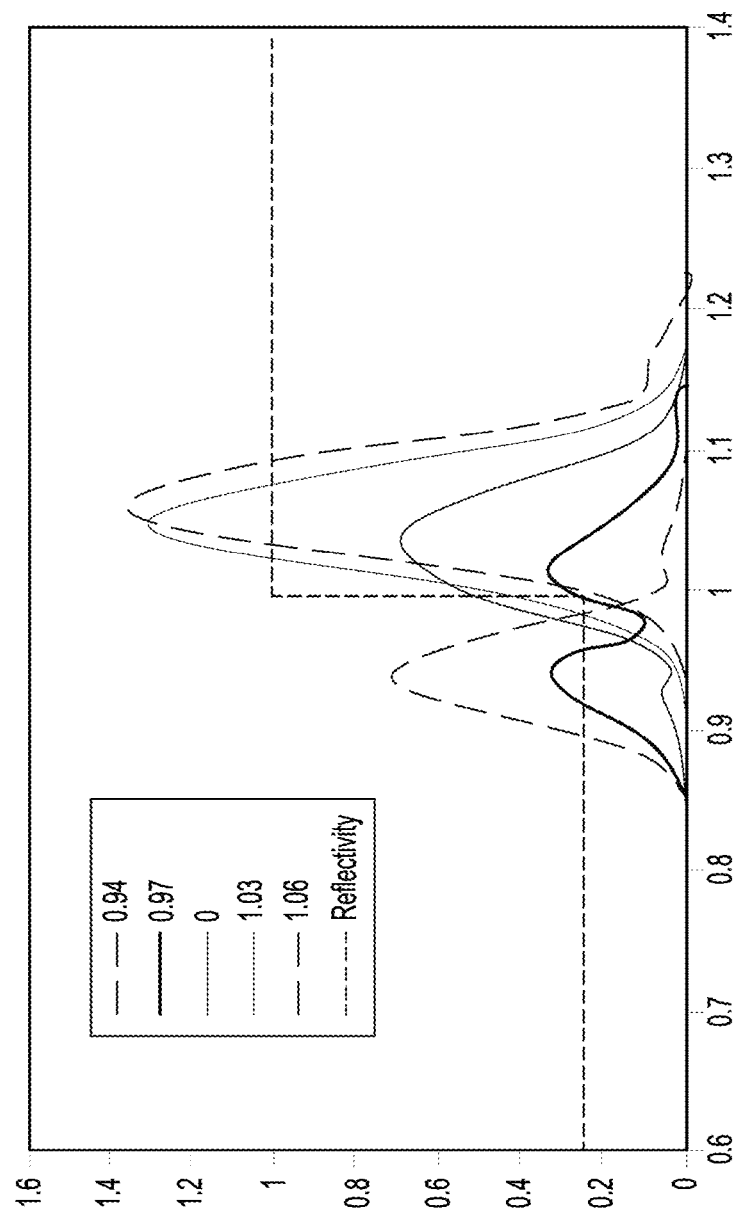
FIG. 3 shows variable speckle sensor response at a wide band width.

FIG. 3 represents the affects of moving a laser speckle pattern over a consistent surface by small amounts where X-axis again indicates millimeters while the Y-axis indicates intensity. This is exemplary when a laser illuminates an area that is large relative to an area that is imaged by a camera. Thus, the camera images an area that is smaller than, for example, a diameter of a laser beam resulting in an image that appears as a fine speckle pattern. In this arrangement, a transition of a laser beam from one surface to a new surface that includes a texture transition causes an abrupt change in laser speckle pattern. Variable speckle pattern response is shown varying with surface changes as the scan moves from one surface to another surface.

Figure 2:
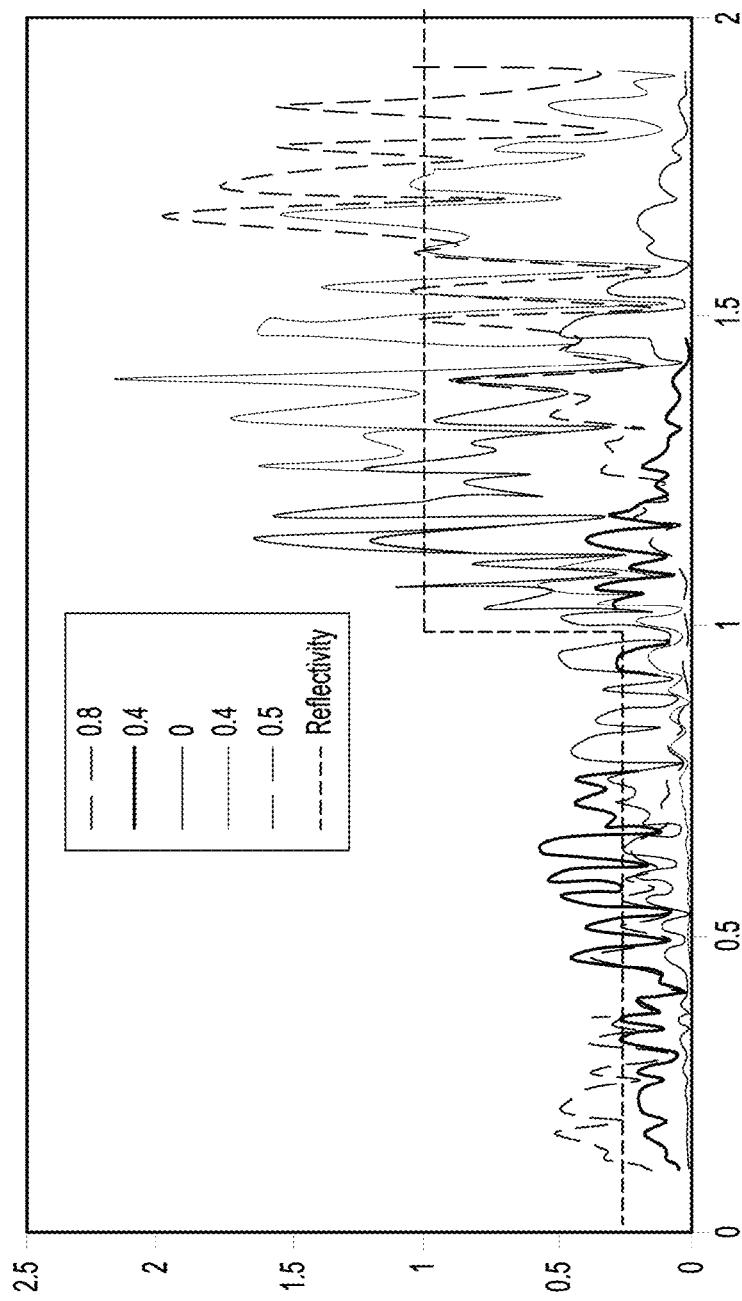
FIG. 2 shows variable speckle sensor response in a narrow bandwidth.

Laser projection systems used for projecting laser templates onto a work surface such as the one disclosed in U.S. Pat. No. 9,200,899 LASER PROJECTION SYSTEM AND METHOD, the contents of which are included herein by reference are particularly suited for this process of the present application due focus of the fine laser spot that is less than one millimeter. While a view of an overview camera is quite course, the typical pixels corresponding to ⅛ to ¼ inch areas also result in optical characteristics of the camera lens blurring the image of the laser spot over multiple pixels. This occurrence is represented in FIG. 2 representing variable sensor response to a narrow band width where X-axis indicates millimeters while the Y-axis indicates intensity. Therefore, the image now appears as Gaussian or near Gaussian shaped spots within the image. However, the location of the image can appear to move erratically due to light wavelength interference. The system of the present invention takes advantage of this erratic movement and variations that occur at very slight offsets of as little as 0.3 mm thereby revealing variations at a scale as small as an orientation of individual fibers even when a camera and laser projector are disposed at large offset distances.

With these technical elements in view, if a laser beam scans crosswise of an elongated direction fibers disposed in a tape or ply, the interference changes rapidly while a scan generally parallel to an orientation of the fibers maintains much greater similarities and less interference to responsive speckle pattern. Scanning the laser in varying directions then establishes and identifies orientation of the individual fibers disposed in a ply even though neither the laser nor the camera has the resolution to image features of the materials directly. It should be understood this process is not limited to only identifying orientation of fibers but can use any distinguishing surface characteristics to determine orientation of a component placed on a work surface.

Figure 4:
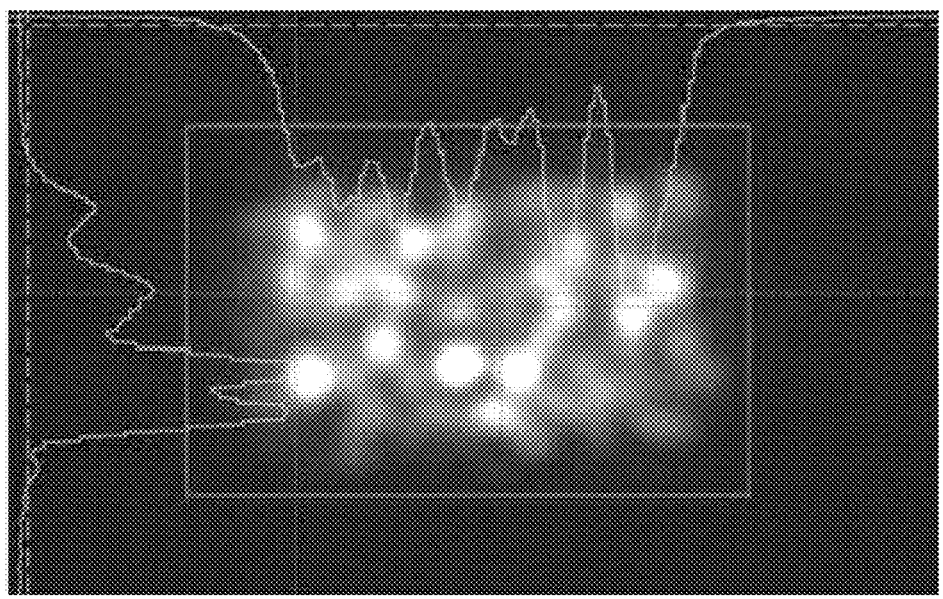
FIG. 4 shows a high contrast speckle pattern of detuned laser scan over an aluminum substrate.

The interaction of coherent light, in this example generated by a laser with a surface of material may be examined through various modes. In one embodiment, the mode includes a scanning a laser at high speeds through an identified zone to create a field illumination. Alternatively, the laser focus can be detuned presenting a large laser dot on the surface using slower scanning speed. In either case, tan image may be generated of laser speckle generated by the laser beam in a local area. As represented in FIG. 4, laser speckle generated upon a plate of 6061 aluminum produces a high contrast speckle pattern that is primarily the result of fine, almost imperceivable scratches or micro-scratches on the surface of the aluminum. Further, any material can be distinguished based upon surface characteristics, anomalies, and specific features from another material. Even when a piece or component is mated to another piece, component, or work surface that is identical material stock the system 10 of the present application is capable of distinguishing one from the other by relying on laser speckle patterns as is explained further hereinbelow.

Figure 5:
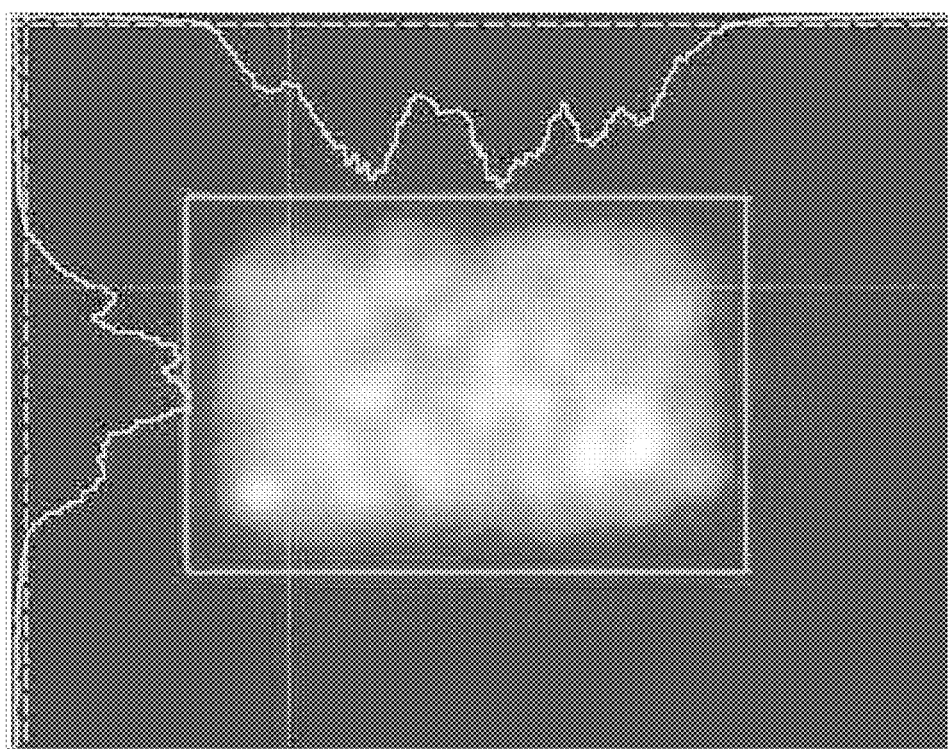
FIG. 5 shows a low contrast speckle patter of a detuned laser scan over a standard sheet of paper.

In contrast, FIG. 5 shows laser speckle as a result of scanning a standard sheet of white paper with coherent light generated by a laser beam. The fine structure of the weave of fibers that make up the paper present a much lower speckle contrast. However, even when low contrast of a speckle pattern is generated, a significant amount of detail may be ascertained by a camera image of the speckle pattern.

Spatial deconstruction of the speckle characteristics by a controller provides details providing the controller the ability to distinguish one component or piece from another component or piece, and event from work surface. As represented in FIG. 5, a schematic of deconstruction of an image of the speckle pattern is represented. In this example, the controller identifies the most intense speckles in the image of bottom portion or quarter of the laser speckle pattern on the sample of 6061 aluminum of FIG. 4. After identifying the most intense speckles, the controller reduces these speckles to a single line of data revealing X/Y coordinates of the speckles in the sensed image. The controller further deconvolves the individual speckles to indirectly identify a location of fine scratches on the material surface that are not visible to either a laser sensor or a camera sensor as will be described further hereinbelow. As used herein, deconvolved refers to a process of reversing optical distortion that takes place in an optical image instrument, thus creating a clear image of, for example, the laser speckle. In one embodiment, deconvolution is achieved in digital domain by a software algorithm using Fournier Transform as part of various image techniques. However, alternative methods of achieving deconvolution of images of the laser speckle are also within the scope of this invention. It should be understood that the process of deconvolution is usable to sharpen surface images that may otherwise be unclear due to fast motion, jiggles or dynamic movement of the camera or laser projector during image capture, including broad spectrum of laser speckle.

Figure 7:
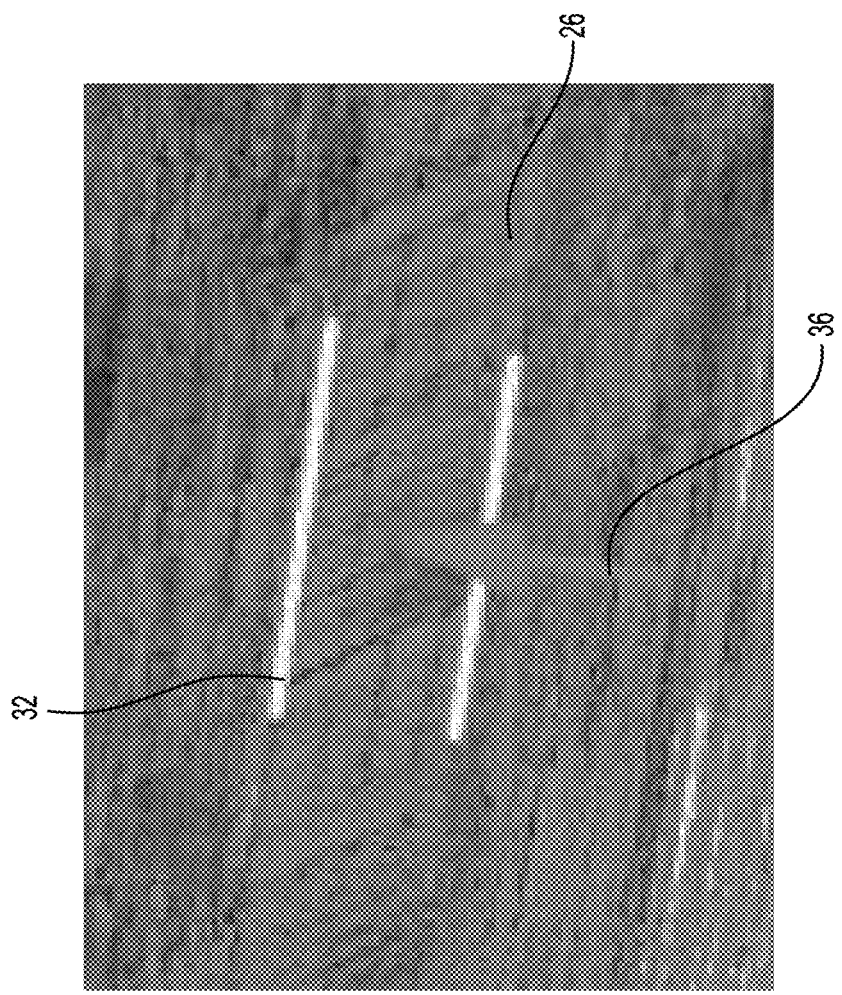
FIG. 7 shows a coherent light source scan by a laser projector of a workpiece by a coherent light source.
Figure 6:
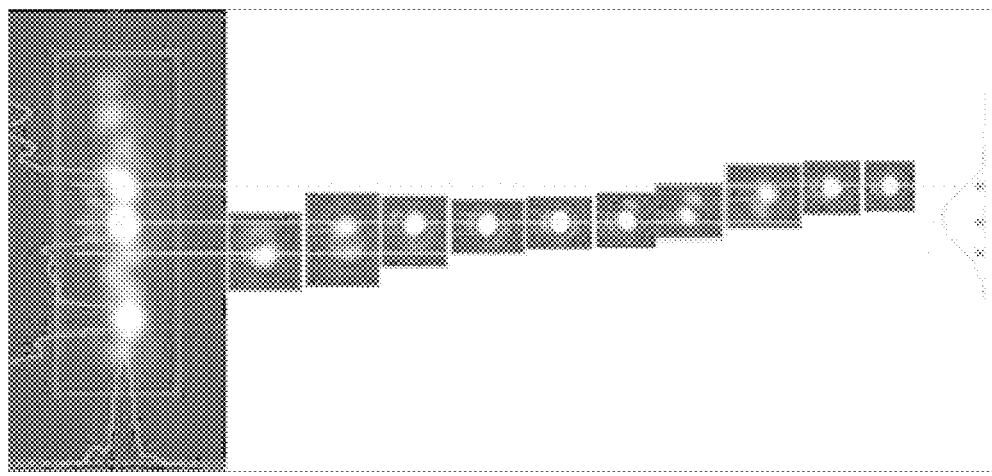
FIG. 6 shows a deconstructed composite image of imperceptible scratches disposed upon the aluminum substrate of FIG. 4.

In view of the inventive principles set forth above, the system and method of the various embodiments of the present invention making use of an enhanced scanning system as generally shown at 10 of FIG. 7 will now be described in detail. In a first embodiment, a source of coherent light is a laser 12 that project green laser beam 14 at 532 nm. The laser beam 14 generated by the laser 12 is redirected by a first scanning mirror 16 that is driven by a first galvo motor 18 and a second scanning mirror 20 that is driven by a second galvo motor 22 in a conventional manner. The scanning mirrors 16, 20 direct the laser beam 14 toward a work surface 24 having an assembled piece 26 to be characterized for placement and orientation.

A camera 28 is synchronized with movement of the galvo motors 18, 22 to track the scanning laser beam 14 as it scans the piece 26 and the work surface 24. In a typical scan configuration, the camera 28 monitors return beam 30 intensity as the laser beam 14 scans across the piece 26 associating time of detection to the position of the scan.

Figure 8:
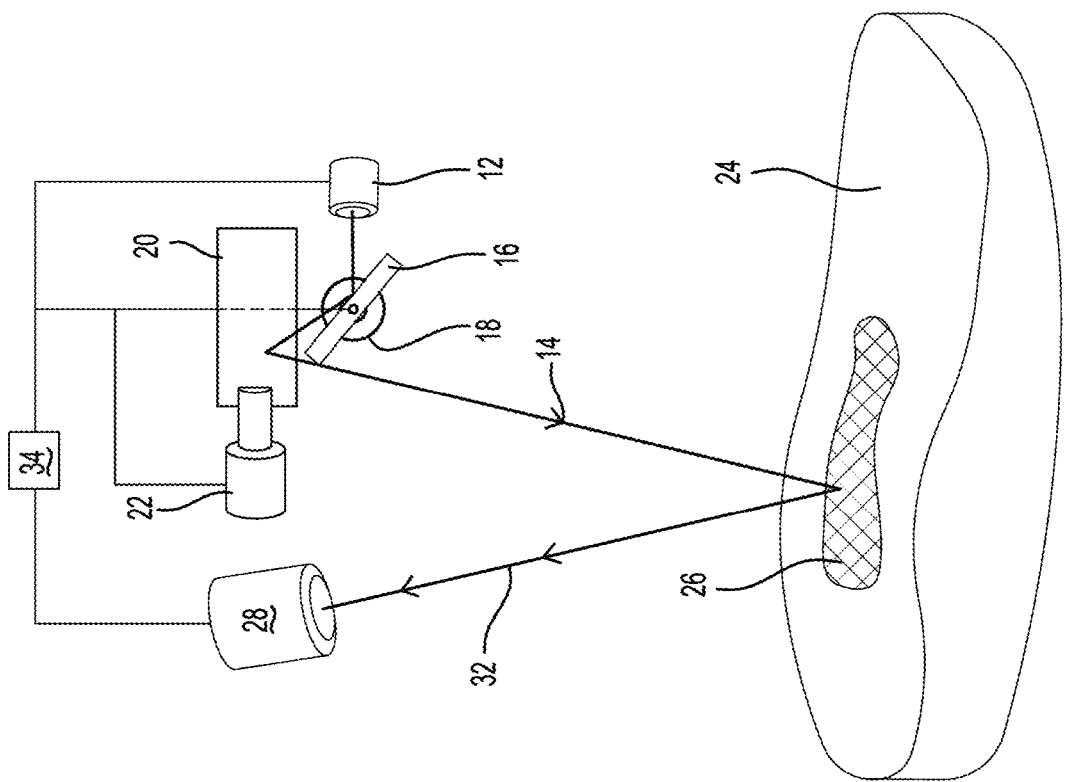
FIG. 8 shows a laser line projection aligned parallel to an expected ply boundary.

To explain validation of location and orientation of a placed piece 26, reference to FIG. 8 is made. A laser line 32 is scanned parallel to an expected boundary of the piece 26 when mated to the work surface 24. In this embodiment, an outline of the piece 26 is known, particularly when a laser template has been projected onto the work surface 24 for directing placement of the piece 26 as is described in U.S. Pat. No. 9,200,899, LASER PROJECTION SYSTEM AND METHOD; U.S. Pat. No. 9,245,062, LASER PROJECTION SYSTEM USING VARIABLE PART ALIGNMENT; U.S. Pat. No. 9,442,075, GALVANOMETER SCANNED CAMERA WITH VARIABLE FOCUS AND METHOD; and U.S. Pat. No. 9,881,383, LASER PROJECTION SYSTEM WITH MOTION COMPENSATION AND METHOD; the contents each of which are included herein by reference. A controller 34 by way of identifying a location of the work surface 24 in a three-dimensional coordinate system has already determined a boundary of the piece 26 on the work surface when projecting a laser template directing where to place the piece 26. Even if the piece 26 has been misplaced, the controller 34 knows where the piece 26 should be for the purpose of projecting the laser line 32. Thus, for the purpose of sampling the laser line 32, the laser beam 14 scans toward the piece 26 boundary.

When the laser beam 14 generated by the laser 12 scans to the work surface 24 from the piece 26, laser speckle pattern changed abruptly representative of the different surfaces of the piece 26 and the work surface 24. As represented in FIG. 8 the piece 16 is shown as a composite tape impregnated with fibers and the work surface 24 is shown as a prior applied composite tape impregnated with fibers onto which the piece 16 is applied as directed by the laser template. In this embodiment, the fibers disposed in the piece 16 are oriented differently than the fibers disposed in the work surface 24 presenting a dislocation of the pattern. Sweeping the laser beam 14 crosswise of the piece 16 (in the direction of arrow 36) across expected boundary establishes actual placement of the piece by way of change in laser speckle characteristics. The demarcation between two different speckle characteristics define the actual boundary of the placed piece 26 on the work surface 24. The actual boundary is then compared to the required boundary visibly defined by the laser template during placement. It should be understood that the image in FIG. 8 is magnified for clarity as the distance between laser lines 32 is only pixels and the fibers are imperceivable to the human eye.

It should also be understood that fibers disposed in the piece 26 and the work surface 24 may be oriented in the same direction, orientation of the sampling line 32 is varied to establish the path of the fiber and identify the boundary of the placed piece 26. Scanning the laser beam 14 in a direction that is perpendicular to the fibers provides maximal speckle interference variation while scanning the laser beam 14 in the same direction as the fibers produces the most consistent speckle behavior. It is believed that scanning the laser beam in both directions may provide the best results.

The system 10 is also useful for validating placement of a piece 26 on a work surface 24 when more complex material textures are involved, such as, for example, weaves of fibrous materials. In this case, sampling a region of material and classifying orientation of, for example, patches to determine overall structure may be necessary. Comparison to a digital library of materials stored by the controller 34 may be employed. However, this may require transformation of three-dimensional characteristics of the weave, including identifying distance between the laser projector to the area of the work surface 24 and ply that is sampled, identifying orientation of the surface, and shape of the surface when the surface is not flat. When a laser projector is employed that is used to project laser templates onto the work surface 24 the controller 34, when used conventionally, has calculated the location of the work surface 24 in a three-dimensional coordinate system prior to beginning the validation process.

Alternatively, it may desirable to operate the system 10 in a mode where an initial closely supervised assembly process us used to train the fiber characteristics for each assembly step. In this case, any deviation is monitored from earlier placement that may be caused by inadvertent movement of an earlier placed piece 26. As such, collection of placement and orientation data during the supervised assembly process provides a reference standard that is used to validate the assembly during general production. Further verification is made when Computer Aided Design data includes fibrous piece 26 or ply and orientation information allowing for image comparison.

As set forth above, when a laser projector use for projecting optical templates is employed to direct and supervise assembly tasks, the included laser scanner (in this embodiment the laser 10, scanning mirrors 16, 20, and galvo motors 18, 22) are suitable to scan the work surface 24 and piece 26 being inspected. Therefore, the assembly guide and validation process are all performed by the same system 10. In this embodiment, validating placement of the piece 26 on the work surface 24 may be simplified. Before placing the piece 26, boundary samples adjacent the laser template of the background work surface 24 identifying background speckle characteristics and profile, otherwise known as background signature. In this embodiment, the background signature can be subtracted from the speckle characteristics and profile measured after placement of the piece 26. After the piece 26 has been placed, the placement and orientation is validated by establish that the speckle characteristics and profile of the prior identified background are unchanged for the post placement boundary samples outside the template or proper placement location of the piece. Further, inside the template or proper placement of the piece validation is achieved by identifying an alternated speckle characteristic and profile. A very sensitive speckle characteristic may be achieved of the background work surface 24 when sampling the laser speckle prior to placement of the piece 26. Accurate piece 26 placement is thus established by scanning across the edge of the piece 26 in localized sample areas, or by scanning sample areas parallel to the intended boundary location separated by acceptable placement tolerances, which can be as small as 0.5 mm. When using speckle characteristics measured prior to placement of the piece 26, only samples of the piece 26 after placement should vary (from the prior samples).

Figure 9:
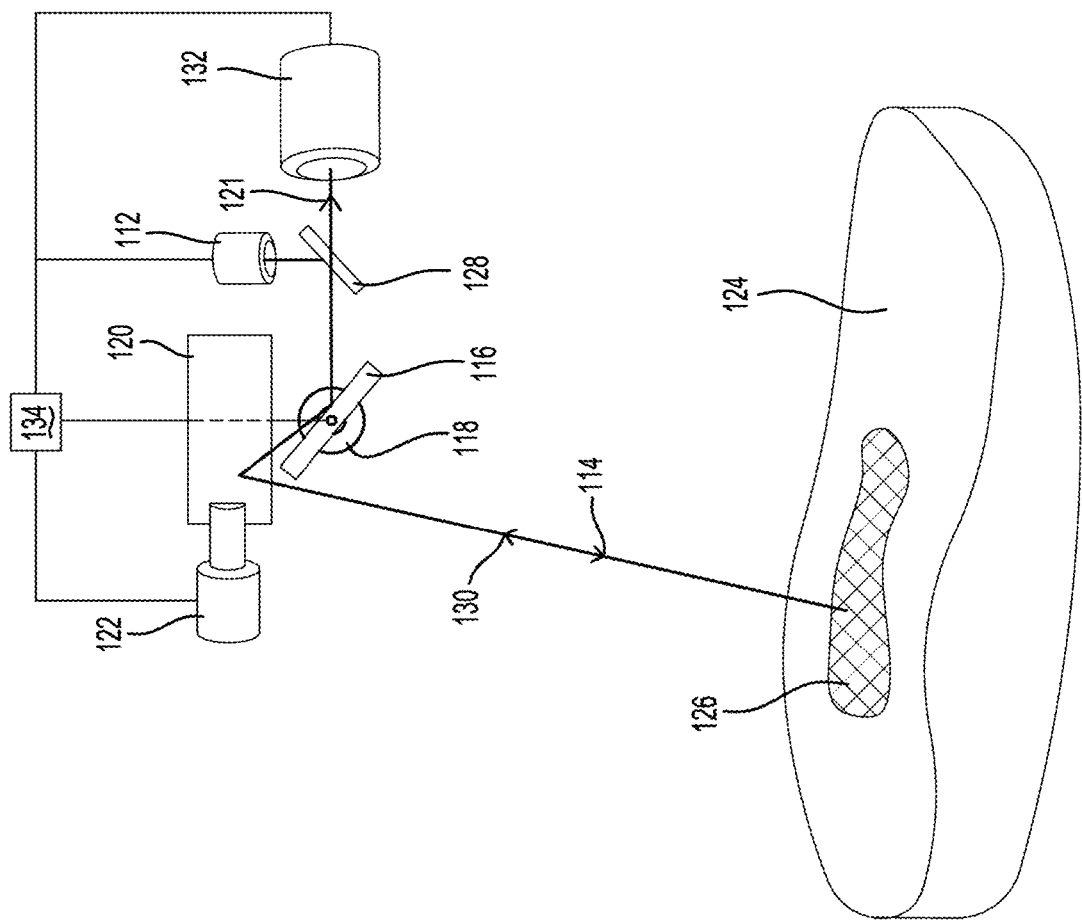
FIG. 9 shows an alternate embodiment of a coherent light source scan by a laser projector of a workpiece by a coherent light source having an optical splitter and sensor.

FIG. 9 shows an alternative system shown generally at 110. In this embodiment, in this embodiment, a source of coherent light is a laser 112 that project green laser beam 114 at 532 nm. The laser beam 114 generated by the laser 112 is redirected by a first scanning mirror 116 that is driven by a first galvo motor 118 and a second scanning mirror 120 that is driven by a second galvo motor 122 in a conventional manner. The scanning mirrors 116, 120 direct the laser beam 114 toward a work surface 124 having an assembled piece 126 to be characterized for placement and orientation.

In this embodiment, a return beam 130 travels along the same path as the project laser beam 114 to an optical beam splitter 128 that allows the return beam 130 to pass through to a light sensor 132. The sensor 132 includes collection optics and sensor electronics such as, for example, at least one of a photodiode, an avalanche photodiode, and a photomultiplier to provide necessary speckle detection sensitivity to identify differing laser speckle characteristics. However, other types of light or laser sensors may also be utilized for the same purpose so long as speckle sensitivity is achieved. In this embodiment, it is conceivable that a conventional laser projector as set forth herein may be employed. Thus, synchronization of the detection of the laser speckle characterization with the motion of the laser beam 114 by way of the mirrors 116, 120 and the galvo motors 118, 120 is easily achieved. Traditional laser scanning systems used for optical template protection is thus repurposed to provide functionality of laser speckle characterization. As in the earlier embodiment, a controller 134 by way of identifying a location of the work surface 124 in a three-dimensional coordinate system has already determined a boundary of the piece 126 on the work surface when projecting a laser template directing where to place the piece 126.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, the invention may be practiced otherwise than is specifically described.

What is claimed is:

1. A method for verifying the placement of pieces within an assembly task, comprising the steps of:
projecting a laser template onto a work surface and scanning the background adjacent the template prior to placing a piece onto the work surface;
placing the piece onto the work surface;
scanning a coherent light source across a surface of the placed piece and along the work surface disposed as a background to the placed piece thereby illuminating the place piece and the work surface with coherent light;
providing an optical sensing system for recording the optical characteristics of an interference speckle produced by scattered light from the coherent light;
classifying the speckle response for discriminating between the surface of the piece and the background to validate the placement of the piece.

2. The method set forth in claim 1, further including a step of scanning the background with coherent light prior to placing the piece of onto the work surface for and storing an image of the background prior to classifying the speckle response for discriminating between the surface of the piece and the background.

3. The method set forth in claim 1, further including a step of spatial deconstruction of the speckle characteristics into individual spot images.

4. The method set forth in claim 3, further including a step of de-convolving the individual spot images to reveal deviations in two dimensions.

5. The method set forth in claim 1, wherein the step of scanning a coherent light source across the surface of the placed piece is further defined by scanning a laser bean thereby illuminating the placed piece and the background work surface with said laser beam.

6. The method set forth in claim 1, further including a step of identifying a sampling area of at least one of the placed piece and the background work surface and modifying the sampling area according to an orientation of fibers disposed in the piece.

7. The method set forth in claim 1, wherein the step of scanning a coherent light source across a piece is further defined by scanning the coherent light from the coherent light source in two directions relative to the piece.

8. The method set forth in claim 1, further including the step of a laser projector scanning a laser template on the work surface and using the laser template as boundary for scanning the coherent light source.

9. The method set forth in claim 1, wherein the step of discriminating between the surface of the piece and the background to validate the placement of the piece is further defined by identifying orientation of the piece relative to a scan of the background.

10. A method of identifying an accurate placement of a piece within an assembly task, comprising the steps of:
identifying a predetermined location of a piece on a work surface as part of an assembly task by projecting a laser template upon the work surface tracing an outline of the predetermined location of the piece on the work surface;
placing the piece on the work surface at the predetermined location;
scanning coherent light from a coherent light source over the piece and over at least a portion of the work surface onto which the piece has been assembled;
providing an optical sensing system for sensing first speckle characteristics of the coherent light reflected from the piece and sensing second speckle characteristics of the coherent light reflected from the work surface as coherent light is scanned over the piece and the work surface; and
signaling the first speckle characteristics and the second speckle characteristics to a controller for distinguishing the first speckle characteristics from the second speckle characteristics thereby determining if the piece has been placed upon the work surface at the predetermined location.

11. The method set forth in claim 10, wherein the step of identifying a predetermined location of a piece is further defined by identifying orientation of the piece.

12. The method set forth in claim 10, wherein the step of scanning coherent light from a coherent light source is further defined by said coherent light source comprising a laser projector.

13. The method set forth in claim 10, further including a step of signaling the second speckle characteristics to the controller prior to placing the piece in the predetermined location.

14. The method set forth in claim 10, wherein the step of scanning coherent light from a coherent light source is further defined by scanning coherent light in a first direction and a second direction over the piece and at least a portion of the work surface.

15. The method set forth in claim 10, further including a step of said controller identifying a sampling area on said piece and at least a portion of said work surface for providing said optical sensing system toward the sampling area and said controller modifying the sampling area according to an orientation of fibers disposed in the piece.

16. The method set forth in claim 10, further including a step of de-convolution of the first speckle characteristics and the second speckle characteristics into individual speckles for identifying Gaussian intensity profile of each speckle thereby distinguishing the piece from the work surface.

17. The method set forth in claim 10, further including a step of said controller using the laser template as a boundary for scanning the coherent light source and sensing first speckle characteristics and second speckle characteristics.

18. The method set forth in claim 10, further including a step of scanning the coherent light source along the piece and work surface in a plurality of directions thereby identifying orientation of fibrous material disposed in the piece and the work surface.

* * * * *